United States Patent

Hause

[11] 3,747,436
[45] July 24, 1973

[54] POWER PACKAGE
[75] Inventor: Gilbert K. Hause, Bloomfield Hills, Mich.
[73] Assignee: General Electric Corporation, Detroit, Mich.
[22] Filed: June 28, 1971
[21] Appl. No.: 157,235

[52] U.S. Cl............ 74/730, 60/347, 60/357, 60/358, 74/759, 192/3.26, 192/3.27
[51] Int. Cl. .. F16h 45/00, F16h 47/08, F16d 33/02
[58] Field of Search.............. 74/730, 731, 732, 74/688, 677, 655, 759; 192/3.25, 3.26, 3.27; 60/347, 357, 358

[56] References Cited
UNITED STATES PATENTS

| | | | |
|---|---|---|---|
| 2,173,604 | 9/1939 | Dodge | 192/3.26 X |
| 2,564,999 | 8/1951 | Scheuerman, Jr. | 74/732 X |
| 2,632,539 | 3/1953 | Black | 192/3.27 |
| 2,726,556 | 12/1955 | Greenlee | 74/732 X |
| 2,736,407 | 2/1956 | Smirl | 74/732 X |
| 3,043,161 | 7/1962 | Tuck | 74/677 X |
| 3,067,632 | 12/1962 | Foerster et al | 74/759 |
| 3,138,964 | 6/1964 | Stockton | 74/730 X |
| 3,188,887 | 6/1965 | Gabriel | 74/677 X |
| 3,425,295 | 2/1969 | Galaniuk | 74/677 |
| 3,466,947 | 9/1969 | Smith | 74/759 |

Primary Examiner—Charles J. Myhre
Assistant Examiner—Thomas C. Perry
Attorney—W. E. Finken, Charles R. White et al.

[57] ABSTRACT

The engine drives a variable capacity fluid coupling operatively connected to a four-speed forward and one-speed reverse planetary gear unit. Controls are provided for changing the capacity of the coupling for improved transmission operation. For initially moving a vehicle using this transmission, the capacity is reduced to unload the engine so that it may rapidly accelerate to higher speeds for a rapid increase in power. To prevent engine racing and for improved economy of subsequent operation the capacity is then increased so that full engine torque can be absorbed by the coupling and transmitted to the gear unit. In this invention there is an advanced clutch package submerged within the coupling to provide for a reduced overall transmission length and for improved and simplified clutch package control.

8 Claims, 3 Drawing Figures

PATENTED JUL 24 1973

INVENTOR.
Gilbert K. Hause
BY
Charles R. White
ATTORNEY

POWER PACKAGE

This invention relates to power packages and more particularly to a transmission having a variable capacity hydrodynamic torque transmitting unit driven by an engine for controlling engine speed and power and the torque transmitted by the unit and further having an improved arrangement of friction drive establishing devices for controlling the operation of the transmission gear unit.

The hydrodynamic torque transmitting unit of this invention may be either a fluid coupling or a hydrodynamic torque converter with a plurality of rotors, one of which has a plurality of sections that can be selectively connected together or disconnected in a manner to change the torque transmitting capacity of the unit. In the preferred embodiment of this invention there is a fluid coupling with a pump having a first bladed section fixed to the front cover of the coupling for rotation therewith and a second bladed section which can be selectively connected or disconnected with respect to the first. The second section is mounted for limited axial movement within the unit and has an outer friction surface that cooperates with a friction surface of the interior of the front cover to form a friction clutch.

The hydrodynamic unit transmits power to a four-speed forward and one-speed reverse gear unit. In this invention the torque transmitting capacity of the coupling is selectively changed in a manner to improve transmission operation including starting, gear shifting and economy of operation.

To permit the engine driving this hydrodynamic transmission, having a selected stall speed, to rapidly accelerate toward a peak power condition, the second bladed section of the pump is not connected to the input so that only the first bladed section is active. Under this first engine-coupling match, the torque transmitting capacity of the fluid unit is such that it unloads the engine so that the engine will quickly accelerate to provide increased engine power for initial vehicle propulsion. To provide for the efficient transmittal of engine power and to prevent engine racing, the second section is drivingly connected to the first section by the engagement of the friction clutch to change the stall speed of the transmission and to increase the torque transmitting capacity of the fluid unit. The load added by the second section of the pump initially reduces engine speed but this second matching of the coupling to the engine provides for the more efficient transmission of engine power through the coupling.

Under idle conditions, only the first section of the pump is operative so that the fluid unit operates as a low torque transmitting capacity coupling. With the coupling efficiency thus reduced, the transmission of power produced by the idling engine is reduced thus substantially reducing vehicle creep.

This fluid unit is highly compact since the second section requires only limited axial movement for clutch engagement and disengagement and requires no enlarged or special housing accommodations. The piston mechanism and related controls are simplified and straightforward and need only minimal space. The planetary gear unit as preferably controlled by selective engagement of the friction devices, provides for reverse and four forward drives including an overdrive. With this transmission, there is improved and efficient operation, which is particularly beneficial with low power-to-weight vehicles in which economy of operation is of major importance.

The friction drive establishing devices of this transmission include a compact rotatable clutch package disposed within the confines of the coupling to substantially reduce overall transmission length. The clutch package has two clutches submerged in oil inside of the coupling housing with static pressure operating on the controlling servos or pistons to thereby eliminate the piston return springs. This eliminates the need for a centrifugal pressure relief ball valve since the centrifugal pressures acting on the pistons are equal and opposite so that there is no undesired force tending to engage the clutches.

Other features, objects and advantages of this invention will become more apparent from the following drawings and detailed description in which.

Figure 1:
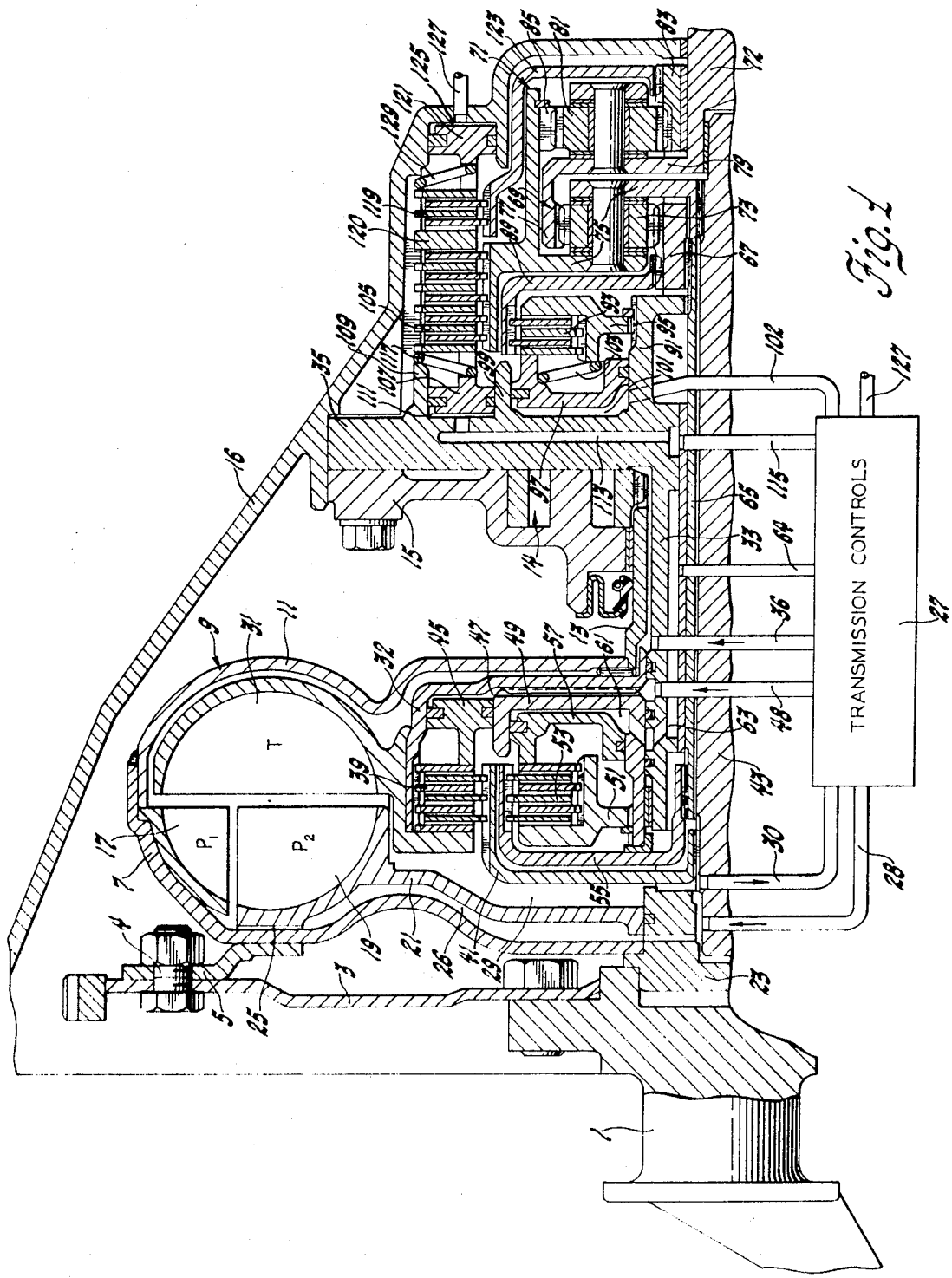
FIG. 1 is a sectional view of the upper half of a transmission illustrating a preferred embodiment of this invention.

The transmission of FIG. 1 has an engine diagrammatically shown as crank 1 driving a flex plate 3 which is secured by bolt means 4 to drive lugs 5 that are welded or otherwise fastened to the shell-like front cover 7 of a fluid unit or coupling 9. The front cover 7 is drivingly secured to a rear cover 11 which is secured at its center to a sleeve shaft 13 extending longitudinally in the transmission to drive the internal gear of hydraulic pump 14 housed in pump support 15 fixed inside of the transmission case 16. This pump operates to provide operating fluid pressure for the transmission and the later described controls.

The coupling has a two-section impeller or rotor formed by a bladed first section 17 or $P_1$ which is rigidly fastened to the interior of the front cover 7 and a second bladed section 19 or $P_2$ which has a piston-like, inner-supporting disc 21 mounting the second section for limiting axial movement on support hub 23 fixed to the center of front cover 7. The second section is formed with an outer friction surface that cooperates with an adjacent friction portion of the inside of front cover 7 to form a friction clutch 25. These friction surfaces can be moved into and out of engagement with appropriate axial movement of the second section 19; when clutch 25 is engaged, the front cover can drive the second section of the impeller and when released, this section will float with the circulating fluid.

To provide for this axial movement a fluid chamber 26, formed between disc 21 and the front cover, is hydraulically connected to suitable hydraulic controls 27 by passage 28. When operating fluid is fed into the coupling through this passage, the force exerted by the feed pressure on the disc 21 will move the disc and connected second section 19 axially away from the front cover 7 to disengage the clutch 25. Engagement of this clutch is accomplished by opening chamber 26 and 28 to exhaust through the controls so that coupling fluid circulating within the coupling and exiting to the controls through discharge passages 29 and 30 exerts a force on the second section of the pump directed toward the front cover to axially move the second section to cause the engagement of clutch 25.

In addition to the two-section pump there is a bladed turbine 31 rotatably disposed within the housing provided by the front and rear covers, which is employed to drive the transmission gearing, later described.

The turbine 31 is fixed on a drum 32 that is rotatably mounted on a stationary supporting sleeve 33 axially extending from a bulkhead 35 secured to the transmission case 16. A coupling inlet passage is formed between drum member 32 and cover 11, which is connected to the controls 27 by feed passage 36. Disposed within this drum member is a multi-plate outer clutch 39 comprising drive discs splined to the interior of the drum member, which are interleaved with friction discs splined to a hub member 41 that is drivingly secured to a drive shaft 43, which extends along the rotational axis of this transmission. A piston 45 for effecting the engagement of this clutch is mounted for axial movement within drum 32 forming pressure chamber 47 therewith. This chamber is connected to the controls by fluid passage 48. Disposed within drum 32 is an inner drum or support member 49 splined to the inside of drum 32. Drum 49 has an outer annular wall supporting piston 45 and an inner annular wall mounted on sleeve 33. Fixed to the inner sleeve of inner drum 49 is a support 51 for a multiplate clutch 53. This clutch is formed by drive discs splined to an annular shoulder on support 51 which are disposed between friction discs that are splined to a hub member 55 located just inside of the hub member 41. There is an annular piston 57 movably mounted within the walls of drum 49 for effecting the drive engagement and disengagement of clutch 53. Piston 57 cooperates with drum 49 to form an expansible control chamber 61 which hydraulically communicates with the transmission controls through passageways 63 and 64.

As shown, hub 55 is splined to an axially extending sleeve shaft 65 which surrounds the shaft 43 and which is splined to a sun gear 67 of a first planetary gearset 69 which combines with a second planetary gearset 71 to provide a four-speed forward and one-speed reverse planetary gear unit. Sun gear 67 of gearset 69 meshes with planet gears 73 rotatably supported on a carrier 75 that is splined to the end of shaft 43. Planet gears 73 also mesh with ring gear 77, which is connected to a carrier 79 that supports the rotatable planetary gears 81 of planetary gearset 71 and that is drivingly connected to the transmission output shaft 72. The planetary gears 81 mesh with a sun gear 83 and a ring gear 85. This ring gear is connected to a cylindrical extension projecting from the carrier 75 of the first planetary gearset.

The sun gear 67 of the first planetary gearset is drivingly connected to drum 89 which can be connected to a shoulder 91 extending axially from bulkhead 35 by a multi-plate friction device 93. This friction device has friction plates splined to the outer annular wall of drum 89 and steel plates interleaved with the friction plates splined to a clutch support 95 which is in turn splined to shoulder 91. A piston 97 mounted between annular shoulders 91 and 99 and forming expansible chamber 101 therewith is movable axially to effect the frictional engagement of friction brake 93 when supplied with operating fluid from the controls through passage 102. Return spring 103 will move this piston to the off position when chamber 101 is opened to exhaust through the controls.

This transmission has a reverse drive multi-plate friction device or brake 105 which is engaged by piston 107 mounted between annular shoulder 99 and an outer annular shoulder 109 extending from the bulkhead 35. Piston 107 in conjunction with shoulders 99 and 109 forms an expansible chamber 111 which is hydraulically connected to the controls by passages 113 and 115 so that control pressure fed to this chamber will cause the axial movement of piston 107 and the frictional engagement of the multi-plate friction brake 105. Return spring 117 contacts piston 107 to urge it to an off position when chamber 111 is exhausted.

A first and second multi-plate friction brake 119 is engageable by the selective actuation of piston 121 to hold sun gear 83 for reaction. The friction device has steel plates splined to the interior of case 16 interleaved with friction plates splined to the outer periphery of hub member 123 which is directly connected into the teeth of sun gear 83. Piston 121 cooperates with shoulder portions formed in case 16 to form an expansible chamber 125 which is connected to the controls 27 by passage 127. Return spring 129 contacts piston 121 to urge it to an off position when chamber 125 is exhausted of pressure fluid by controls 27. A stationary annular backing plate 120 is disposed between the brakes 105 and 119.

With this arrangement of gearing and friction devices, four forward and one reverse drives are obtained as indicated by the following chart with the letter X indicating engagement of the identified friction device.

|     | 39 | 53 | 93 | 105 | 119 |
|-----|----|----|----|-----|-----|
| 1st |    | X  |    |     | X   |
| 2nd | X  |    |    |     | X   |
| 3rd | X  | X  |    |     |     |
| 4th | X  |    | X  |     |     |
| R   |    | X  |    | X   |     |

In neutral all of the clutches and brakes are released so that no power will flow through the gearing to the output shaft.

In first, clutch 53 and brake 119 are engaged so that the compound action of the planetary gearsets produces low forward drive ratio. For second range drive the clutch 53 is released as clutch 39 is engaged so that the torque multiplication ratio is reduced to provide a second range drive with input into the ring gear 77. Sun gear 83 is held for reaction and the gearing produces a second reduction drive ratio. For third, both clutches 39 and 53 are applied to lock up the planetary gear for one-to-one drive. For fourth or overdrive, clutch 39 is engaged and the sun gear 67 is held by engagement of brake 93. With the carrier 75 being driven and sun gear 67 being held for reaction, the ring gear 77, which is connected to the output shaft 72, is driven at an overdrive speed ratio. For reverse, clutch 53 and brake 105 are engaged so that the carrier 75 is held for reaction and the ring gear 77 connected to the output shaft 72 is driven in a reverse direction.

The improved clutch design disposed within the fluid unit, the single backing plate 120 for brakes 105 and 119, the concentric pistons 107 and 97 and clutch 93 and brake 105 provide for a shortened transmission making it more flexible to use in many installations. For example, this feature makes this transmission readily usable in a vertical installation where the power package compartment has a small height. The input clutches are submerged in transmission oil inside of the coupling housing; this eliminates the need for piston return springs and pressure relief ball valves and thus reduces the complexity of the clutch controls.

For an improved start-up of the vehicle, the coupling is fed with operating fluid from the controls through chamber 26 so that clutch 25 is disengaged. The capacity of the fluid unit is reduced since only section 17 of the pump is active. This provides for improved initial propulsion of the vehicle since the torque transmitting capacity of the fluid coupling is small in comparison with the output of the engine allowing the engine to be rapidly accelerated toward a high operating speed and starting torque. For good coupling efficiency to insure that the engine power available for vehicle propulsion is efficiently directed to the drive wheels, the chamber 26 is exhausted through the controls so that clutch 25 is applied by an apply force exerted by working fluid in the coupling to connect the second section of the pump to the inside of the housing.

Figure 2:
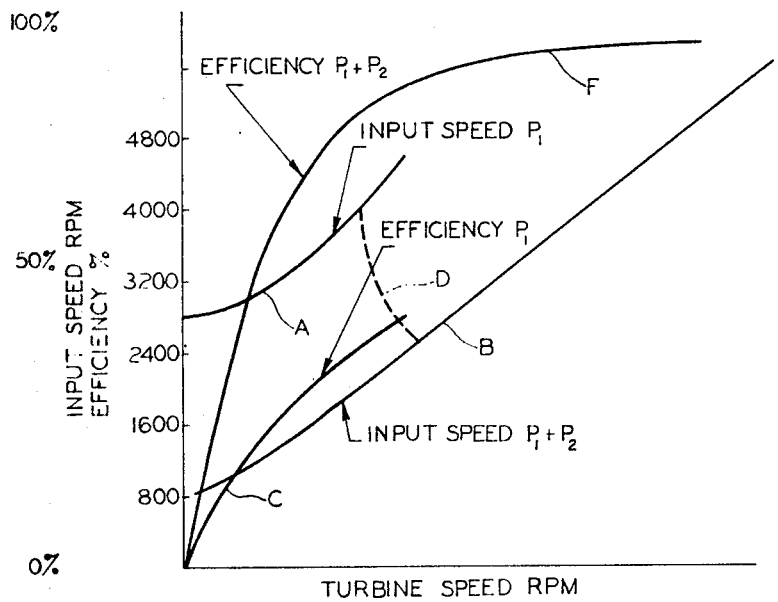
FIG. 2 shows curves illustrating operation of the transmission of FIG. 1.

FIG. 2, showing input speed curves A and B for the engine-driven pump at sea level, illustrates this preferred operation of the invention. For initial propulsion of the vehicle, clutch 25 is disengaged to release the second section of the pump $P_2$ or 19 so that only the first section $P_1$ or 17 is active. An example stall speed of the coupling with only the first section active is 2,800 r.p.m., as shown by input speed curve A whereas the stall speed with both sections of the pump active is 800 r.p.m. Thus, these curves show that vehicle start up is improved by employing only the first section of the pump since the engine operates at a much higher speed, producing greater power to provide the motive force for good vehicle performance.

As shown by curve C, efficiency is low when the coupling has only the first section of the pump active. To improve operating efficiency after the vehicle has accelerated to a desired speed, the second section of the pump is clutched to the first as a gear change is made. Transition curve D between input speed curves A and B shows one example of this operation in which the input speed is reduced from about 4,000 r.p.m. to about 2,500 r.p.m. As shown by curve F, with both pump sections $P_1 + P_2$ connected, the overall efficiency of the coupling is sharply increased to transmit the engine power to the gear unit.

When there is vehicle deceleration toward a vehicle speed below which the engine speed would become too slow with both pumps absorbing power, the second section of the pump is released to provide the transition from input speed curve B to A to increase input speed as best shown in FIG. 2. The torque transmitting capacity of the coupling being reduced minimizes the inertial effects of the engine to thereby facilitate gear changes during the change in coupling capacity.

Figure 3:
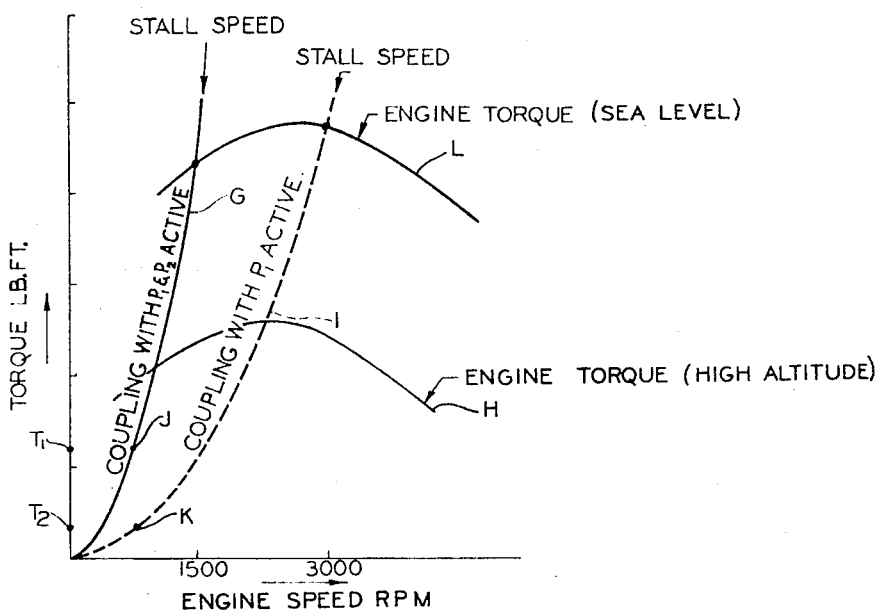
FIG. 3 is a view of curves illustrating the matching of a dual capacity coupling with an engine.

Typical automobile engines do not run well below 1,200 or 1,300 r.p.m. at high altitudes such as 10,000 ft. above sea level. As shown in FIG. 3, there is a stall speed curve G for a coupling with both sections of the pump constructed in accordance with this invention which intersects an example high altitude engine torque curve H at a low stall speed point such as 1,000 r.p.m., for example. Such a speed as pointed out above, is not suitable for high altitude operation. By releasing the second section of the pump the stall speed is increased to about 2,250 r.p.m. as shown by the intersection of stall speed curve I with the high altitude engine torque curve H. Under these conditions the engine operates at a satisfactory speed at high altitudes to provide the power necessary to initially propel the vehicle through the transmission. As in the case with lower altitude operation, the second section of the pump is subsequently coupled with the first section to increase efficiency. Curve L illustrates the increase in engine torque at sea level as compared to high altitude engine torque. In this example, the stall speed of the coupling with both pump sections active would be about 1,500 r.p.m. and about 2,900 with only the first section active.

FIG. 3 further illustrates how the invention reduces vehicle creep under engine idle conditions with the release of the second section of the pump from pumping operation. Assuming that point J on stall speed curve G is the idle point, it will be seen that a torque $T_1$ is transmitted through the coupling. This idle torque is substantially reduced by the release of the second section of the pump. When only one section of the pump is active, the stall speed curve I illustrates the coupling operation. The idle speed is shown by point K on the curve. At this idle point the torque has been reduced from $T_1$ to a smaller torque $T_2$ as illustrated. Thus, under engine idle conditions, clutch 25 will be released so that only the first section of the pump is active.

While a preferred embodiment of the invention has been shown and described, other embodiments will now be readily apparent to those skilled in this art. For example, a torque converter could readily be employed instead of the coupling. The pump of the hydrodynamic unit could be made with three or more sections with separate sections selectively engageable with the front cover for selective pumping action with the first section to achieve three or more capacities. Also there could be graduated partial engagement of the additional sections such as the second section 19 of the pump to control capacity between a minimum capacity and the maximum capacity obtained by the full engagement of clutch 25. Instead of having the pump formed from multiple sections, the turbine could be a multi-section element with the sections selectively connected to provide a change in torque capacity. Thus, this invention is not limited to the embodiment shown and described but by the following claims:

What is claimed is:

1. A power package comprising an engine, a hydrodynamic torque-transmitting unit having a housing drivingly connected to said engine, rotatable turbine means operatively disposed in said housing, pump means operatively mounted in said housing, said pump means having separate first and second bladed sections disposed adjacent to said turbine means for pumping oil into said turbine means, connecting means securing said first section to said housing, support means mounting said second section for rotation in said housing radially inwardly from said first section, selectively engageable clutch means operatively disposed in said housing for selectively connecting said second section to said housing so that said first and second sections exert an increased torque on the oil in said housing and simultaneously pump oil into said turbine means to increase the torque capacity of said fluid unit and for selectively disconnecting said second section from said housing so that only said first section pumps oil into said turbine means to decrease the torque on the oil to thereby decrease the torque capacity of said fluid unit, a clutch unit operatively disposed within said housing radially inwardly of said pump means and said turbine means, said clutch unit having separate first and second selectively engageable clutches operatively connected to said turbine, a gear unit, an output shaft operatively connected to said gear unit, first and second torque transmitting shafts operatively connecting said first and second clutches to said gear unit, first piston means disposed within said housing for effecting the selective engagement of said first clutch means so that said turbine drives said first torque transmitting shaft and second piston means disposed radially inwardly of said first piston means for effecting the selective engagement of said second clutch so that said turbine drives said second torque transmitting shaft.

2. The power package of claim 1 wherein said fluid unit has a central hub portion disposed radially inwardly of said pump and turbine means, support means disposed in said hub portion for concentrically mounting said first and second clutches and said piston means in said hub portion submerged within the oil of said unit.

3. A power package for vehicle propulsion comprising engine means having an output torque which increases from a minimum to a maximum torque in response to the acceleration of said engine from zero to a predetermined speed of rotation and subsequently which decreases from said maximum output torque as said engine means is further accelerated from said predetermined speed of rotation, a hydrodynamic unit having a rotatable housing operatively connected to said engine, rotatable turbine means operatively disposed in said housing, pump means operatively mounted in said housing, said pump means having separate first and second bladed sections disposed adjacent to said turbine means for pumping fluid into said turbine means, means securing said first section to the interior of said housing, support means mounting said second section for rotation in said housing radially inwardly of said first section, selectively engageable clutch means operatively disposed in said housing for selectively connecting said second section to said housing to increase the quantity of fluid pumped by said pump means and thereby increase the torque capacity of said fluid unit and for disconnecting said second section from said housing to decrease the quantity of fluid pumped by said pump means and thereby decrease the torque capacity of said fluid unit.

4. In a power transmission having rotatable input and output means, a hydrodynamic fluid unit having a housing drivingly connected to said input means, first and second rotor means operatively mounted in said housing for circulating fluid therein, torque transmitting means drivingly connecting said first rotor means to said output means, one of said rotor means having a plurality of independent and separate bladed sections, support means rotatably mounting the inner of said bladed sections in said housing concentric with respect to the other of said sections and adjacent to the other of said rotor means, securing means rigidly securing the outer of said sections to the interior of said housing, selectively operable input clutch means operatively disposed within said housing selectively engageable for connecting said separate sections with each other to increase the capacity of said fluid unit to spin increased quantities of oil in said housing to thereby increase the torque absorption of said hydrodynamic fluid unit.

5. The power transmission of claim 4 and further including a change-speed gear unit operatively connected to said torque transmitting means, first and second drive clutch means operatively disposed in said housing for drivingly connecting one of said rotor means to said gear unit, a plurality of friction drive establishing devices selectively engageable to condition said gear unit for at least two different forward drive speed ratios, one of said separate sections being disposed inwardly from a first of said sections and having an outer shell with a plurality of blades extending therefrom for directing oil circulated by said unit, said input clutch means comprising a friction surface on said shell and a friction surface on said housing, and control means for said clutch means for effecting the engagement of said input clutch means to increase the capacity of said fluid unit.

6. In a power transmission having rotatable input and output means, a hydrodynamic torque transmitting unit operatively connecting said input and output means to provide a hydrodynamic drive therebetween, said hydrodynamic unit having a housing, bladed input rotor means and bladed output rotor means operatively disposed in said housing forming a torus for the circulation of working fluid supplied to said hydrodynamic unit in response to rotation of said input means, said bladed input rotor means having a plurality of separate sections, support means rotatably supporting one of said sections in said housing radially inwardly of another of said sections, each of said sections having an outer shell with a plurality of blades extending therefrom, selectively engageable clutch means located in said unit for drivingly connecting said sections together, said clutch means comprising a friction surface on said outer shell of one of said sections and a friction surface on the inside of said housing, and motor means for effecting the engagement of said clutch means so that said input means drives said sections to condition said hydrodynamic unit for high capacity operation in transmitting torque from said input to said output and for selectively releasing said clutch means to disconnect said sections to reduce the torque transmitting capacity of said hydrodynamic unit.

7. The power transmission of claim 6, said input rotor means comprising first and second sections concentrically mounted with respect to each other, said hydrodynamic unit having rotatable housing means for drivingly connecting said first section to said transmission input, said outer shell of said second section having a clutching surface formed on the outside thereof which is movable into clutching engagement in response to an engaging force exerted by fluid in the unit with the inside of said housing means to form said clutch means for drivingly connecting said sections together.

8. In a power transmission having rotatable input and output means, a hydrodynamic torque transmitting unit operatively connecting said input and output means to provide a hydrodynamic drive therebetween, said hydrodynamic unit having a housing, bladed input rotor means and bladed output rotor means operatively disposed in said housing forming a torus for the circulation of working oil supplied to said hydrodynamic unit in response to rotation of said input means, said bladed input rotor means having separate first and second sections, each of said sections having an outer shell with a plurality of blades extending therefrom, selectively engageable clutch means located in said unit for drivingly connecting said sections together to increase the effective discharge area of said input rotor means and exert an increased torque on the oil in said unit without changing the exit angle of said input rotor means, said clutch means comprising a friction surface on one of said sections and a friction surface on the inside of said housing, and motor means for effecting the engagement of said clutch means so that said input means drives said sections to condition said hydrodynamic unit for high capacity operation in transmitting torque from said input to said output and for selectively releasing said clutch means to disconnect said sections to reduce the torque transmitting capacity of said hydrodynamic unit.

* * * * *

UNITED STATES PATENT OFFICE
CERTIFICATE OF CORRECTION

Patent No. 3,747,436    Dated July 24, 1973

Inventor(s) Gilbert K. Hause

It is certified that error appears in the above-identified patent and that said Letters Patent are hereby corrected as shown below:

Title page: [73] Assignee: General Electric Corporation should be -- General Motors Corporation --. Column 2, line 43, "limiting" should be -- limited --.

Signed and sealed this 17th day of September 1974.

(SEAL)
Attest:

McCOY M. GIBSON JR.
Attesting Officer

C. MARSHALL DANN
Commissioner of Patents